US011955067B2

(12) United States Patent
Cook

(10) Patent No.: US 11,955,067 B2
(45) Date of Patent: Apr. 9, 2024

(54) SIMPLIFIED RATE CONTROL FOR AN ADDITIVE ITERATIVE COMPRESSION SYSTEM

(71) Applicant: SAMSUNG DISPLAY CO., LTD., Yongin-si (KR)

(72) Inventor: Gregory W. Cook, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/332,889

(22) Filed: May 27, 2021

(65) Prior Publication Data

US 2022/0301502 A1 Sep. 22, 2022

Related U.S. Application Data

(60) Provisional application No. 63/162,439, filed on Mar. 17, 2021.

(51) Int. Cl.
*G09G 3/3208* (2016.01)

(52) U.S. Cl.
CPC ... *G09G 3/3208* (2013.01); *G09G 2310/0291* (2013.01); *G09G 2320/0257* (2013.01)

(58) Field of Classification Search
None
See application file for complete search history.

(56) References Cited

U.S. PATENT DOCUMENTS 10,515,612 B2 12/2019 Mobasher et al.
10,803,791 B2 10/2020 Mobasher
(Continued)

FOREIGN PATENT DOCUMENTS

EP 2843843 A1 3/2015

OTHER PUBLICATIONS

Antonio-Torres et al.; LUT-based compensation model for OLED degradation; ACADEMIA, Journal of The Society for Information Display, vol. 13, No. 5, 2005, 8 pages.
Lindstrom et al.; Fast and Efficient Compression of Floating-Point Data; IEEE Transactions on Visualization and Computer Graphics, vol. 12, No. 5, Sep./Oct. 2006, pp. 1245-1250.
Martin; *Range encoding: an algorithm for removing redundancy from a digitised message.; IBM UK Scientific Center; Jul. 24-27, 1979, 11 pages.
(Continued)

*Primary Examiner* — Benjamin C Lee
*Assistant Examiner* — Emily J Frank
(74) *Attorney, Agent, or Firm* — Lewis Roca Rothgerber Christie LLP

(57) ABSTRACT

A method of rate control of a display device includes receiving compressed stress data for a slice of a display, decompressing the compressed stress data to obtain reconstructed stress data for the slice, adding additional stress data to the reconstructed stress data to obtain updated stress data for the slice, encoding the updated stress data at a first precision level ($p_c$) to generate first updated compressed stress data for the slice, in response to a size ($b_c$) of the first updated compressed stress data for the slice of the display exceeding a size ($b_t$) of a buffer, determining a second precision level (p) based on the first precision level ($p_c$), a third precision level ($p_s$) of the additional stress data, and a fourth precision level ($p_b$) of the buffer, and encoding the updated stress data at the second precision level (p) to generate second updated compressed stress data.

20 Claims, 5 Drawing Sheets

(56) References Cited

U.S. PATENT DOCUMENTS

| | | | | |
|---|---|---|---|---|
| 10,860,399 | B2 | 12/2020 | Mobasher et al. | |
| 2002/0118747 | A1* | 8/2002 | Liu | H04N 19/14 375/E7.181 |
| 2010/0150227 | A1 | 6/2010 | Lee | |
| 2010/0195713 | A1* | 8/2010 | Coulombe | H04N 19/152 375/E7.126 |
| 2012/0287141 | A1 | 11/2012 | Higgins et al. | |
| 2015/0062202 | A1* | 3/2015 | Lu | G09G 3/2044 345/691 |
| 2015/0194096 | A1* | 7/2015 | Chung | G09G 3/3225 345/78 |
| 2015/0243201 | A1 | 8/2015 | Chung et al. | |
| 2017/0352165 | A1* | 12/2017 | Flordal | G06T 9/00 |
| 2019/0034082 | A1* | 1/2019 | Gonzalez | G06F 3/0647 |
| 2019/0221158 | A1* | 7/2019 | An | G09G 3/003 |
| 2019/0287454 | A1 | 9/2019 | Cook et al. | |
| 2019/0295510 | A1* | 9/2019 | Mobasher | G09G 3/3208 |
| 2019/0297347 | A1 | 9/2019 | Lee | |
| 2019/0356918 | A1 | 11/2019 | Demos et al. | |
| 2020/0264876 | A1* | 8/2020 | Lo | G06K 9/6262 |
| 2020/0372858 | A1 | 11/2020 | Mobasher et al. | |

OTHER PUBLICATIONS

Martucci; Reversible Compression of HDTV Images Using Median Adaptive Prediction and Arithmetic Coding; School of Electrical Engineering, Georgia Institute of Technology; © 1990 IEEE, 4 pages.

Strutz; Multiplierless Reversible Color Transforms and Their Automatic Selection for Image Data Compression; IEEE Transactions on Circuits and Systems for Video Technology, vol. 23, No. 7 Jul. 2013, pp. 1249-1259.

Walls et al.; VESA Display Stream Compression for Television and Cinema Applications; IEEE Journal on Emerging and Selected Topics in Circuits and Systems, vol. 6, No. 4, Dec. 2016, pp. 460-470.

Witten et al.; Arithmetic Coding for Data Compression, Computing Practices, Communications of the ACM, vol. 30, No. 6, Jun. 1987, pp. 520-540.

Taiwanese Office Action dated Oct. 18, 2023, issued in corresponding Taiwanese Patent Application No. 111109734 (9 pages).

* cited by examiner

SIMPLIFIED RATE CONTROL FOR AN ADDITIVE ITERATIVE COMPRESSION SYSTEM

CROSS-REFERENCE TO RELATED APPLICATION(S)

The present application claims priority to, and the benefit of, U.S. Provisional Application No. 63/162,439, filed Mar. 17, 2021, entitled "Simplified Rate Control for an Additive Iterative Compression System," the entire content of which is incorporated herein by reference.

FIELD

One or more aspects of embodiments of the present disclosure relate to displays, and to a system and method of rate control capable of predicting an acceptable rate of precision within few iterations.

BACKGROUND

Light-emitting elements, such organic light-emitting diodes (OLEDs) in an OLED display, may deteriorate over time due to use, thereby leading to a decline in output. OLED degradation is the gradual loss of luminance that OLED displays experience over time, with the amount of degradation being driven by the content of the images shown on the display (e.g., higher pixel values driving more current which causes higher degradation).

One type of OLED degradation may be referred to as differential aging, which is the mismatch in the loss of brightness from pixel to pixel, which may lead to "image sticking" or "ghosting." Compensation methods for compensating output decline in a display device may be used to preserve image quality as a use time of the display device increases, thereby compensating for the aging of the display device.

Rate control is a compensation method that may allow for the continuous adjustment of a quantization amount based on how much memory is available in a buffer of the display device, and based on a number of pixels remaining in an image that are to be compressed. Rate allows a stress profile to be compressed into a suitable size by adjusting the quantization (e.g., by adjusting precision).

However, some methods of rate control (e.g., a log-search rate control) may require six iterations or more before determining a sufficient amount of compression to enable the compressed data to fit in the buffer.

Accordingly, it may be suitable to determine a method of rate control that is able to determine an appropriate amount of compression in fewer iterations.

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

According to some embodiments of the present disclosure, there is provided a method of rate control of a display device, the method including receiving compressed stress data for a slice of a display, decompressing the compressed stress data to obtain reconstructed stress data for the slice of the display, adding additional stress data to the reconstructed stress data to obtain updated stress data for the slice, encoding the updated stress data at a first precision level ($p_c$) to generate first updated compressed stress data for the slice of the display, in response to a size ($b_c$) of the first updated compressed stress data for the slice of the display exceeding a size ($b_t$) of a buffer, determining a second precision level (p) based on the first precision level ($p_c$), a third precision level ($p_s$) of the additional stress data, and a fourth precision level ($p_b$) of the buffer, and encoding the updated stress data at the second precision level (p) to generate second updated compressed stress data.

Determining the second precision level (p) may include setting the second precision level (p) to be equal to $[(p_c-p_m)b_t/b_c]+p_m$, wherein $p_m$ is a minimum of the third precision level ($p_s$) and the fourth precision level ($p_b$).

The method may further include determining the third precision level ($p_s$) of the additional stress data based on a most significant bit of the additional stress data, and determining the fourth precision level ($p_b$) of the buffer based on a most significant bit of data in the buffer.

Determining the second precision level (p) may include setting the second precision level (p) to be equal to $p_c\ b_t/b_c$.

The first precision level ($p_c$) may be a precision level used to generate the compressed stress data.

The method may further include adding dither, in addition to the additional stress data, to the reconstructed stress data to obtain the updated stress data for the slice.

The method may further include determining the second updated compressed stress data is able to fit in the buffer, and storing the second updated compressed stress data in the buffer.

According to some embodiments of the present disclosure, there is provided a display device, including a buffer configured to store compressed stress data, a decoding circuit configured to receive the compressed stress data for a slice of a display, and to decompress the compressed stress data to obtain reconstructed stress data for the slice of the display, an adding circuit configured to add additional stress data to the reconstructed stress data to obtain updated stress data for the slice, an encoding circuit configured to encode the updated stress data at a first precision level ($p_c$) to generate first updated compressed stress data for the slice of the display, and a processor configured to, in response to a size ($b_c$) of the first updated compressed stress data for the slice of the display exceeding a size ($b_t$) of the buffer, determine a second precision level (p) based on the first precision level ($p_c$), a third precision level ($p_s$) of the additional stress data, and a fourth precision level ($p_b$) of the buffer, wherein the encoding circuit is further configured to encode the updated stress data at the second precision level (p) to generate second updated compressed stress data.

The processor may be further configured to determine the second precision level (p) by setting the second precision level (p) to be equal to $[(p_c-p_m)b_t/b_c]+p_m$, wherein pm is a minimum of the third precision level ($p_s$) and the fourth precision level ($p_b$).

The processor may be further configured to determine the third precision level ($p_s$) of the additional stress data based on a most significant bit of the additional stress data, and determine the fourth precision level ($p_b$) of the buffer based on a most significant bit of data in the buffer.

The processor may be further configured to determine the second precision level (p) by setting the second precision level (p) to be equal to $p_c\ b_t/b_c$.

The first precision level ($p_c$) may be a precision level used to generate the compressed stress data stored in the buffer.

The display device may further include a dithering circuit configured to add dither, in addition to the additional stress data, to the reconstructed stress data to obtain the updated stress data for the slice.

The display device may further include a memory controller configured to store the second updated compressed stress data in the buffer.

According to some embodiments of the present disclosure, there is provided a non-transitory computer readable medium implemented with a display device, the non-transitory computer readable medium having computer code that, when executed on a processor, implements a method of rate control of the display device, the method including receiving compressed stress data for a slice of a display, decompressing the compressed stress data to obtain reconstructed stress data for the slice of the display, adding additional stress data to the reconstructed stress data to obtain updated stress data for the slice, encoding the updated stress data at a first precision level ($p_c$) to generate first updated compressed stress data for the slice of the display, in response to a size ($b_c$) of the first updated compressed stress data for the slice of the display exceeding a size ($b_t$) of a buffer, determining a second precision level (p) based on the first precision level ($p_c$), a third precision level ($p_s$) of the additional stress data, and a fourth precision level ($p_b$) of the buffer, and encoding the updated stress data at the second precision level (p) to generate second updated compressed stress data.

The computer code, when executed on the processor, may determine the second precision level (p) by setting the second precision level (p) to be equal to $[(p_c-p_m)b_t/b_c]+p_m$, wherein $p_m$ is a minimum of the third precision level ($p_s$) and the fourth precision level ($p_b$).

The computer code, when executed on the processor, may further implement the method by determining the third precision level ($p_s$) of the additional stress data based on a most significant bit of the additional stress data, and determining the fourth precision level ($p_b$) of the buffer based on a most significant bit of data in the buffer.

The first precision level ($p_c$) may be a precision level used to generate the compressed stress data.

The computer code, when executed on the processor, may further implement the method by adding dither, in addition to the additional stress data, to the reconstructed stress data to obtain the updated stress data for the slice.

The computer code, when executed on the processor, may further implement the method by determining the second updated compressed stress data is able to fit in the buffer, and storing the second updated compressed stress data in the buffer.

BRIEF DESCRIPTION OF THE DRAWINGS

These and other aspects of the present disclosure will be appreciated and understood with reference to the specification, claims, and appended drawings wherein:

DETAILED DESCRIPTION

Figure 1:
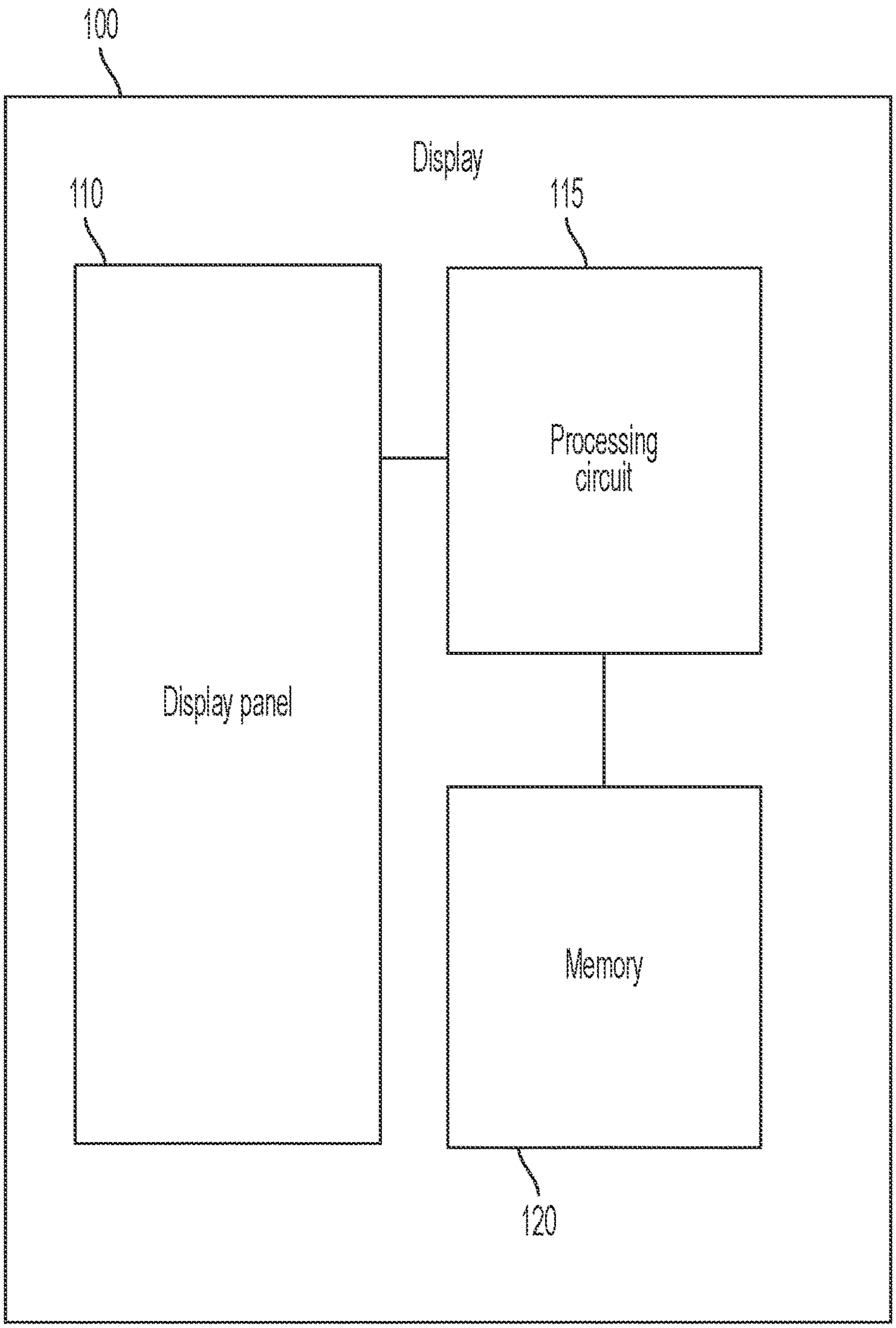
FIG. 1 depicts a block diagram of a display according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear.

The regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a “first” element may not require or imply the presence of a second element or other elements. The terms “first”, “second”, etc. may also be used herein to differentiate different categories or sets of elements. For conciseness, the terms “first”, “second”, etc. may represent “first-category (or first-set)”, “second-category (or second-set)”, etc., respectively.

The terminology used herein is for the purpose of describing particular embodiments only and is not intended to be limiting of the present disclosure. As used herein, the singular forms “a” and “an” are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 depicts a block diagram of a display according to some embodiments of the present disclosure.

Referring to FIG. 1, some video displays may have characteristics that change with use. For example, an organic light-emitting diode (OLED) display 100 may include a display panel 110 having a plurality of pixels, each pixel having a plurality of subpixels (e.g., a red subpixel, a green subpixel, and a blue subpixel). Each of the subpixels may include an OLED configured to emit light of a corresponding color. OLEDS generally have an optical efficiency that declines with use. Accordingly, the optical output of an OLED for a corresponding current may decrease over time due to continued operation of the OLED.

Reduction in optical efficiency of OLEDs may result in parts of the display panel 110 becoming dimmer in comparison to other parts of the display panel 110. For example, areas of the display panel 110 that have, on average, displayed brighter portions of images than other areas of the display 100 may have OLEDs that have deteriorated to a greater degree than the OLEDs of the other areas. Accordingly, the fidelity of image reproduction of the display 100 may degrade over time as a result of the reduction in optical efficiency of some of the OLEDs.

To reduce the effect of such non-uniformities in the optical efficiency of the display 100, the display 100 may include features to compensate for the reduction of optical efficiency of some of the OLEDs resulting from use of the display. These features may include using a memory to store the accumulated stress of each pixel, and using stress data corresponding to the accumulated stress to adjust operation of the display accordingly. For example, degradation may represent a reduced and modified gray scale having conditions that may be determined by a degradation profile, or stress profile, which may establish the acceleration of luminance loss an OLED device experiences under known driving conditions. This stress profile may be saved in memory. However, implementing a full memory to store the stress data can be expensive in terms of gate count and power, so image compression methods may be used to reduce the size of the memory.

As previously mentioned, rate control may allow for the continuous adjustment of a degree of precision based on how much memory is available in a buffer, and based on a number of pixels remaining in a frame that are to be compressed. However, some methods of rate control perform a relatively large number of iterations before determining a sufficient reduction in precision to enable the compressed data to fit in the buffer (e.g., in memory 120). Precision, as used herein, refers to a type of quantization parameter that is similar to a quantization factor.

Some embodiments of the present disclosure relate to compression rate control in an additive iterative compression system that is configured to perform a stress profile on data, and that is able to determine a suitable degree of precision with respect to image data (e.g., to determine a suitable quantization of the image data) within a relatively small number of iterations, such that compressed data suitably fits in the buffer. For example, some embodiments may provide an efficient rate control method for an additive iterative compression system that uses a single compression, as well as information in the current stress data of the stress profile along with previously decompressed image data, to predict an acceptable quantization within a few iterations. It should be noted that, although the display 100 is described as an OLED display above, the embodiments disclosed herein may be applied to other types of displays as well.

According to some embodiments, the display 100 including the display panel 110 may also include a processor/processing circuit 115 and a memory 120. The memory 120 may include a buffer, and may include therein a stress profile (e.g., stress table data, stress data, or stress values) for the display panel 110. The stress data may be used to determine an amount of stress each subpixel has undergone during the life of the display 100. The optical efficiency of a sub-pixel may be estimated based on stress. That is, OLEDs may degrade monotonically with the amount of current that flowed therethrough. The amount of stress for a subpixel may correspond to a total amount of current that has flowed through the subpixel during the life of the display 100 (e.g., may correspond to how heavily loaded the subpixel has been over time). Accordingly, the stress data can be used to determine a degree of compensation for the respective subpixels.

Accordingly, a loss in optical efficiency may be compensated by adjusting the drive current to each subpixel by an amount corresponding to the respective amount of stress indicated by the stress data. That is, the drive current to one or more subpixels may be increased in accordance with, or in proportion to, the estimated loss of optical efficiency of the respective subpixels as estimated by the stress data. Accordingly, the estimated loss of optical efficiency may be accumulated in the stress profile stored in the memory 120. By increasing the drive current, the optical output may be approximate to that of a subpixel that did not exhibit decreased optical efficiency due to stress, thereby improving uniformity in the images displayed on the display panel 110. In one embodiment of the system the drive current is increased by increasing the digital values sent to one or more display digital-to-analog converters used to drive the pixels. As used herein, the digital values may be referred to as drive current values. Accordingly, the drive current values may be increased as corresponding stress accumulates (e.g., as opposed to directly adjusting the analog drive currents).

Figure 2:
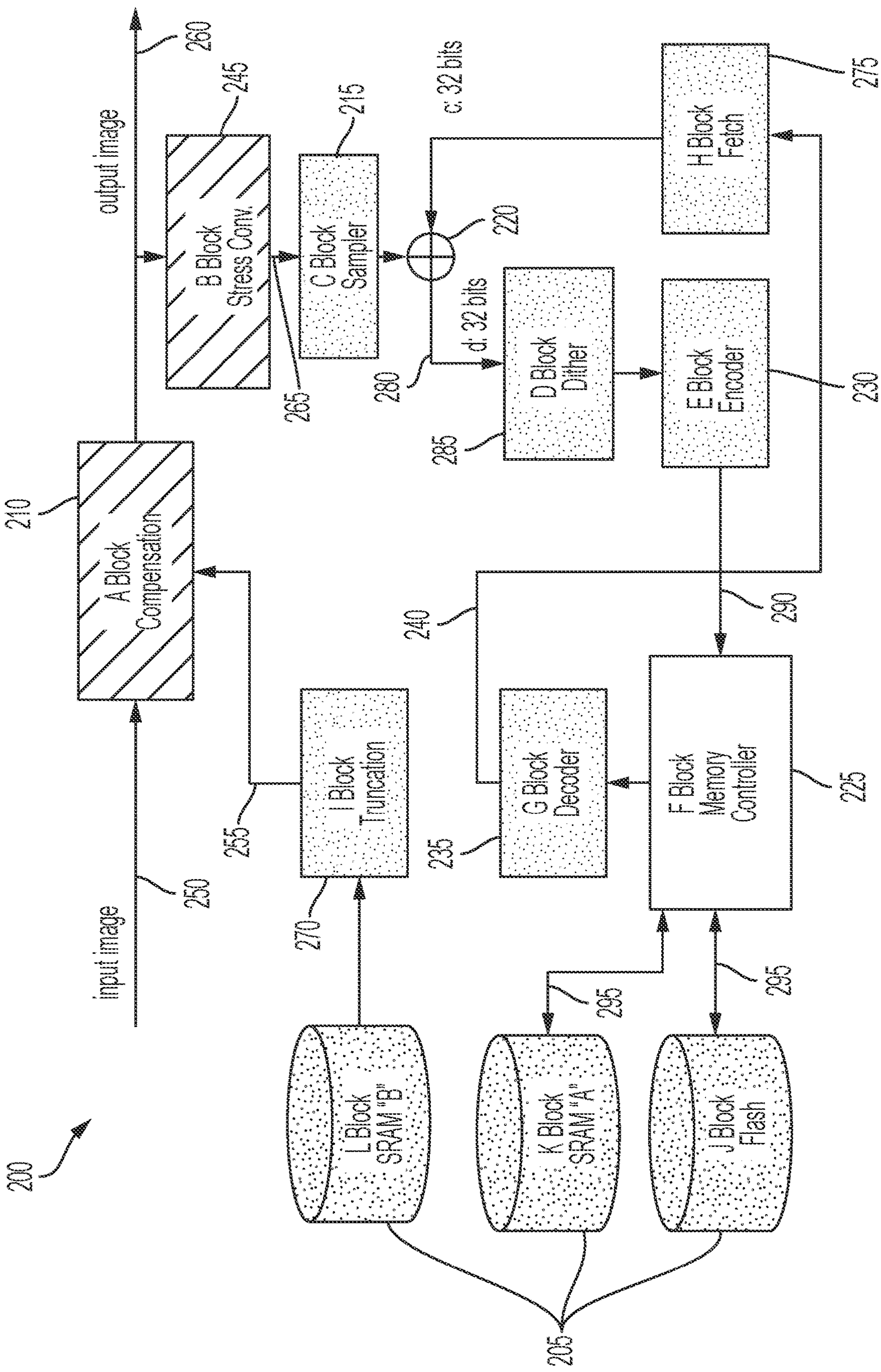
FIG. 2 depicts a block diagram of a system of a display for performing stress compensation using rate control according to some embodiments of the present disclosure.

FIG. 2 depicts a block diagram of a system of a display for performing stress compensation using rate control according to some embodiments of the present disclosure.

Referring to FIG. 2, the system 200 for performing stress compensation using rate control may be implemented, in whole or in part, by the processing circuit 115 of the display 100 of FIG. 1. It should be noted that, as used herein, "encoding" and "compressing," "encoded" and "compressed," "decoding" and "decompressing," and "decoded" and "decompressed," are respectively used interchangeably.

To reduce the effect of nonuniformities in optical efficiency of a display, different compensation methods can be utilized to capture the amount of stress each sub-pixel in the display has been subjected to during the life of the display, wherein the stress can be defined as a total (e.g., time-integrated) drive current that has flown through each sub-pixel during the life of the display. A stress profiler system enables the capture a stress profile of a display by using a memory to accumulate the stress level for an image each time a new image is displayed on an OLED display.

In the system 200, input image data 250 corresponding to an image to be displayed (e.g., displayed on the display panel 110 of the display 100 of FIG. 1) may be received by a compensation circuit 210. As described below, as a continuous stream of images are displayed on the display, the drive current for each pixel in each image may be measured, and a number indicating the current or brightness of each respective pixel may be added to the respective stress stored for that pixel in memory 205.

The compensation circuit 210 may calculate adjusted drive current values using previously stored stress data 255 (e.g., 16-bit stress values) received from memory 205 (e.g., from the buffer or memory 120 of the display 100 of FIG. 1) to produce output image data 260. That is, the compensation circuit 210 may access the memory 205 to calculate an adjustment value for each pixel of an image shown on the display panel 110. The compensation factor for each pixel may be based on the accumulated stress value stored so far in the memory 205 for that pixel. In some embodiments, the input image data 250 and the output image data 260 may correspond to an image corresponding to 10-bit pixel values, although the present disclosure is not limited thereto.

The compensation circuit 210 may calculate the adjusted drive current values of the output image data 260 based on raw drive current values indicated in the input image data 250. The output image data 260 may be used to generate a desired optical output of respective subpixels based on the accumulated stress thereof as indicated by the respective stress values indicated in the previously stored stress data 255. The desired optical output may be generated by using a mathematical model that uses the time the pixel has emitted light to predict the degradation based on empirically derived parameters such as the initial output luminance, the time for which a pixel degrades to 50%, and an alpha exponent parameter that shapes the curve. The output image can be equalized (e.g., made "flat") by inverting the equation corresponding to the mathematical model, and by changing the drive current values according to the stress.

The adjusted drive current values of the output image data 260, which represent the current rate of accumulation of stress of the subpixels, may be received by a stress conversion circuit 245. The stress conversion circuit 245 then converts the adjusted drive current values to produce converted adjusted drive current values 265, which is also known as the stress. The production of the converted adjusted drive current values 265 is accomplished by noting the magnitude of the adjusted drive current value, and by normalizing the adjusted drive current value based on a frame rate of the system, the number of pixels sampled per frame, and a maximum expected time for any single pixel to be turned on over the lifetime of the product, thereby essentially providing a counter that is proportional to the amount of time the pixel is on.

The converted adjusted drive current values 265 then may be captured by a subpixel stress sampling circuit 215. In some embodiments, the sampling circuit 215 may sample only a subset of the converted adjusted drive current values 265 in each image frame.

Then, previously stored stress data (e.g., reconstructed stress data 240 corresponding to one or more previously stored stress values of previously stored compressed stress data 295 stored in the memory 205) may be increased or otherwise augmented by an adding circuit 220 by a current rate of accumulation of stress to generate adjusted stress data 280. For example, respective stress values may be increased by an amount that is proportional to a corresponding adjusted drive current values to generate the adjusted stress data 280. That is, the adjusted pixel value to be shown on the display panel 110 may be sampled by the stress conversion circuit 245 and the subpixel stress sampling circuit 215, and the adjusted pixel value may be added to the previously stored accumulated stress for each pixel and saved back in the memory 205.

The data may be saved back to the memory 205 after being processed for memory requirements. For example, the previously stored stress data may be received indirectly from the memory 205 (e.g., may be received from the memory 205 via a memory controller 225, a decoding circuit 235, and a fetching circuit 275, as described further below). Accordingly, the total amount of stress experienced by each pixel may be accumulated over time and updated in the memory 205.

Then, a dithering circuit 285 may add dither to the adjusted stress data 280 to allow for quantization to be performed thereon. However, it should be noted that the dithering circuit 285 may be omitted in other embodiments.

Then, the adjusted stress data 280 and the added dither may be sent to an encoding circuit 230 (e.g., a compression circuit). The encoding circuit 230 may compress the adjusted stress data 280 and the added dither to generate compressed data 290. Then, the compressed data 290 may be received by the memory controller 225.

The memory controller 225 controls read and write operations in the memory 205. Accordingly, the memory controller 225 may store the compressed data 290 (e.g., stress values having been augmented by the addition of the current rate of accumulation of stress) in the memory 205. Further, the memory controller 225 may receive the aforementioned previously stored compressed stress data 295 from the memory 205. The memory controller 225 may feed the stress values of the previously stored compressed stress data 295 from the memory 205 to the decoding circuit 235.

After receiving the previously stored compressed stress data 295 from the memory controller 225, the decoding circuit 235 may decompress the compressed stress data 295 to generate reconstructed stress data 240. The reconstructed stress data 240 may then be received by the fetching circuit 275, and sent to the adding circuit 220 as the previously stored stress data, such that the process may repeat.

That is, the adding circuit 220 then may add additional stress data, which may be received from the sampling circuit 215 in the form of the aforementioned converted adjusted drive current values 265, to the reconstructed stress data 240 to generate updated stress data as the adjusted stress data 280. Thereafter, the encoding circuit 230 may compress the updated stress data (e.g., the reconstructed stress data 240 with additional stress data and dither) at a first precision level (e.g., a current precision $p_c$) to generate first updated compressed stress data/the compressed data 290, which may be used to update or replace the aforementioned previously stored compressed stress data 295 in the memory 205.

For example, on startup, the compressed stress data 295 is transferred from Flash memory (J Block in FIG. 2) 205 to SRAM "A" (K Block in FIG. 2) 205. Thereafter, the decoding circuit 235 decodes the data in SRAM "A", and places the MSBs of this data in SRAM "B" (L Block in FIG. 2) 205. It may be noted that the exact number of MSBs may depend on the compensating algorithm. The SRAM "B" data is used for the compensation circuit 210 data, and effectively remains static until the next update from SRAM "A", although accumulation may continue to occur in SRAM "A". The SRAM "B" update interval may be dependent on the compensation algorithm. An alternate method of compensation may allow the compressed stress data 295 to be decoded directly from SRAM "A", and the decoded stress data may be used by the compensation circuit 210. Accordingly, the stress profile may be delivered to the compensation circuit 210 by allowing for an interaction between SRAM "A" and SRAM "B", by filling the SRAM "A" memory from flash at startup, and by filling SRAM "B" with the decoded SRAM "A".

Also, in some embodiments, when the compression ratio achieved in operation is not sufficiently high (e.g., when the precision p is not sufficiently low) to allow the compressed slice to fit within the portion of the memory 205 that is allocated to storing the compressed representation of the slice, the raw data may be truncated by a truncation circuit 270 (e.g., one or more of the least-significant bits of each data word may be removed) before compression is performed by the compensation circuit 210, to sufficiently reduce the size of the compressed representation of the slice to fit in the memory. However, an associated computational burden of updating each stress number for each pixel for each frame of video (e.g., for each displayed image) may be significant.

Figure 3:
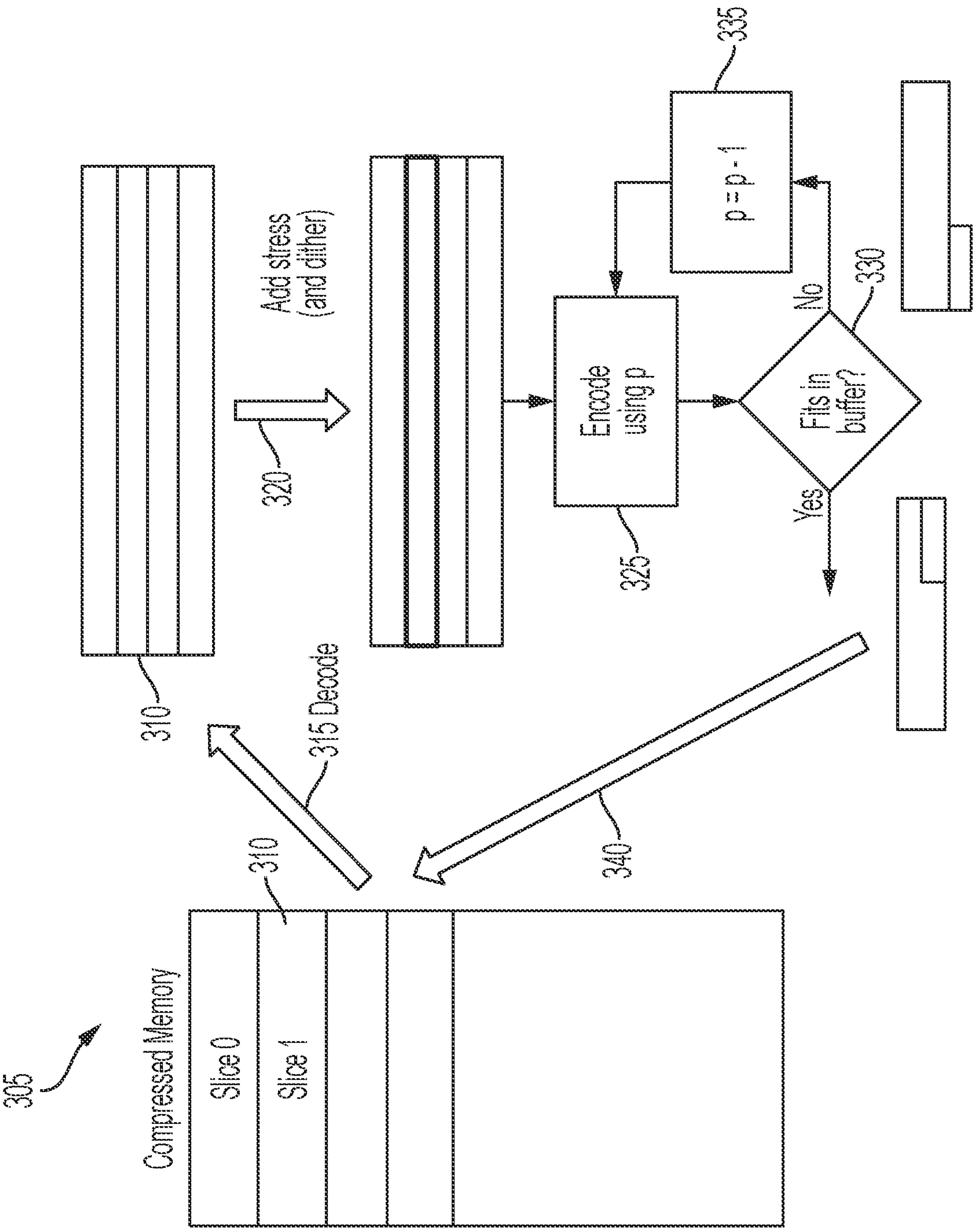
FIG. 3 depicts a conceptual diagram of a method of performing stress compensation using rate control according to some embodiments of the present disclosure.

FIG. 3 depicts a conceptual diagram of a method of performing stress compensation using rate control according to some embodiments of the present disclosure.

Referring to FIG. 3, in a method of compression referred to as stress profile compression, precision may be iteratively reduced by one if compressed stress data does not fit in a memory buffer (e.g., in the memory 205 of FIG. 2, or in the memory 120 of FIG. 1). Stress profile compression is an additive iterative compression method, and may be also referred to as memory compression, which is distinct from streaming compression. Unlike streaming compression, memory compression seeks to compress data to fit inside of the available memory, as no additional buffer is available for storing the compressed data.

In stress profile compression, stress table data may be compressed and decompressed in blocks or slices. In some embodiments each slice may correspond to four consecutive rows of pixels. That is, stress profile compression may be based on a four-line slice. The four rows of pixels of the display panel 110 may be referred to as a slice of the display 100, and the corresponding slice of the stress table data may be referred to as the stress profile of the slice. It should be noted that, in other embodiments, an n×m block of pixels may be used instead of a slice of four rows of pixels, n and m being integers.

Stress profile compression takes a slice 310 (e.g., a four-line slice, such as Slice 1) from compressed memory 305 (e.g., from a buffer in the memory 205 of FIG. 2 or the memory 120 of FIG. 1), decompresses 315 the stress data of the slice 310 (e.g., using the decoding circuit 235 of FIG. 2) to obtain reconstructed stress data (e.g., the reconstructed stress data 240 of FIG. 2).

Then, stress data 320 (e.g., corresponding to the converted adjusted drive current values 265 received from the stress conversion circuit 245 and the sampling circuit 215 of FIG. 2), and optionally dither, may be added to the reconstructed stress data (e.g., added by the adding circuit 220 and/or the dithering circuit 285 of FIG. 2) to provide updated stress data (e.g., to continually accumulate stress values).

The updated stress data may be compressed 325 (e.g., by the encoding circuit 230 of FIG. 2) using a predicted precision p (e.g., a level of precision p that was previously used to compress a previous slice, such as Slice 0, that was suitably sized to be successfully stored in the compressed memory 305) to provide updated compressed stress data (e.g., the first updated compressed stress data/the compressed data 290 of FIG. 2) for the four-line slice.

Then, it may be determined 330 whether the compressed four-line slice (e.g., the first updated compressed stress data) fits in the portion of the compressed memory 305 that is allotted for the four-line slice. However, the added stress data 320 that was added to the decompressed slice 310 may subsequently make the updated compressed data too large to fit in the allotted portion of the compressed memory 305. If it is determined that the updated compressed memory data is too large to fit entirely within the compressed memory 305, the level of precision p may be decremented 335 by one, and the slice 310 may be recompressed 325 (e.g., by the encoding circuit 230 of FIG. 2) to provide second updated compressed memory data (e.g., a recompressed version of the compressed data 290 of FIG. 2). The second updated compressed memory data may then again be measured to determine 330 whether the compressed memory data fits in the compressed memory 305.

Under normal operating conditions, by the precision p being decremented 335 by one (e.g., by increasing a quantization step size by one), the entropy may be sufficiently lowered to enable the updated compressed data to fit in the corresponding slice of the compressed memory 305. Once the compressed data is able to fit in the compressed memory 305, the compressed data may be stored 340 (e.g., by the memory controller 225 of FIG. 2) in the compressed memory 305. Then, the process may be repeated on a subsequent slice 310 (e.g., Slice 2).

However, under abnormal operating conditions, such as when dealing with relatively high stress values (e.g., when the added stress data 320 is large), or under high stress conditions (e.g., more than 8-bits), many more than one extra compression process 325 may occur before sufficiently lowering the precision p to allow for the compressed data to fit in the memory 305. Accordingly, reduction of the precision p to sufficiently reduce the compressed data size to fit in the memory 305 may call for multiple iterations of the compression process 325. For example, there may be 32-bits of stress data per color per pixel (e.g., the stress value of each subpixel may be stored as a 32-bit number). Accordingly, a log-search rate control may use six or more iterations of the compression process 325 before the compressed memory data is able to fit in the buffer in the memory 305. The computational burden of updating each stress value for each image frame (e.g., for each displayed image of a video) associated with a relatively large number of compression processes 325 may be significant.

To ensure an acceptable level of performance (e.g., an acceptable degree of latency of the system of the display 100), there may be a limit to a suitable number of iterations (e.g., iterations of the compression process 325). For example, the hardware implementation of some embodiments may have a limit of four iterations. Further, it may be useful to estimate the precision with relatively low complexity.

Figure 4:
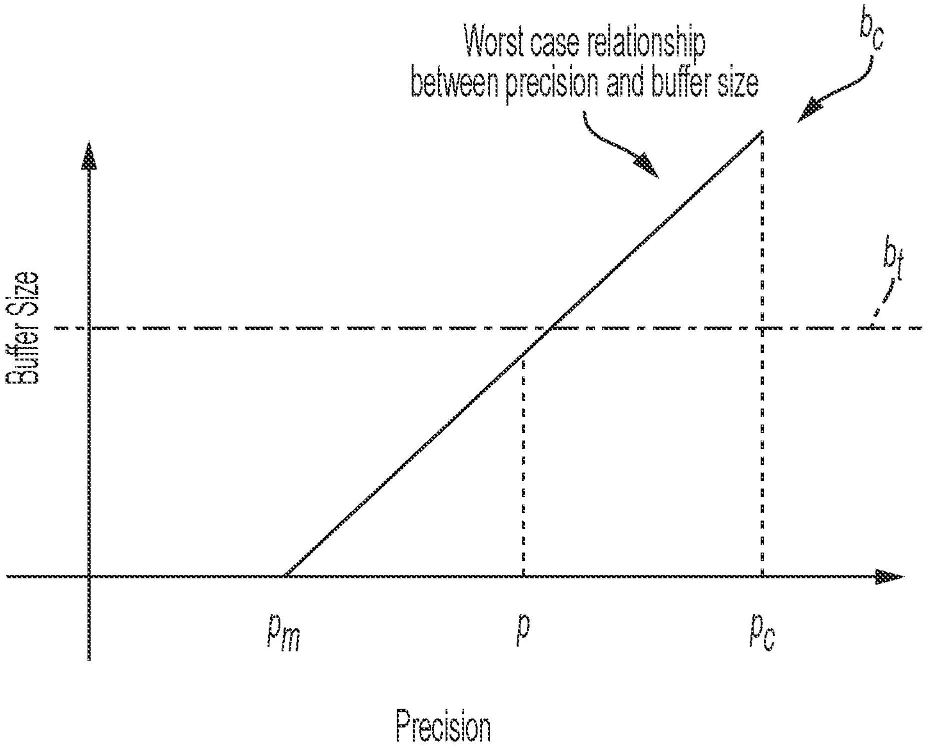
FIG. 4 depicts a worst case relationship between precision and buffer size (e.g., an entropy level corresponding to complete randomness, or maximum entropy) according to some embodiments of the present disclosure.

FIG. 4 depicts a worst case relationship between precision and buffer size (e.g., an entropy level corresponding to complete randomness, or maximum entropy) according to some embodiments of the present disclosure.

Referring to FIG. 4, it may be noted that random noise (e.g., a worst case scenario) will have a lowest slope shown on a graph of Precision (e.g., an inverse of quantization) versus Buffer Size (e.g., a size of the compressed data to be placed in the buffer in memory). The slope corresponding to random noise may be essentially linear (e.g., wherein each bitplane has the same entropy). Other patterns, however, may have a higher slope, and might not be linear, but instead may be monotonically decreasing. Lowering the precision (e.g., increasing the quantization) lowers the buffer size (e.g., decreases the size of the compressed data to be placed in the compressed memory 305 of FIG. 3, the memory 205 of FIG. 2, or the memory 120 of FIG. 1). Some embodiments of the present disclosure may use the encoding circuit 230 of FIG. 2 to plot the buffer size for all possible precisions.

According to some embodiments of the present disclosure, the timing constraints of the system may determine a number of allowable compression iterations (e.g., four) before the precision p is determined such that the compressed data may fit in the buffer. However, in some embodiments, the rate control may converge to an acceptable degree of precision within three compression iterations (e.g., within three compression processes 325 of FIG. 3) or fewer. Contrastingly, a log-search rate control may use six iterations, or even more, on average.

Instead of dividing the remaining buffer by the number of pixels, as may be performed in a typical rate control method, embodiments of the present disclosure use a ratio of a target buffer size (e.g., a maximum size of the compressed data that would be able to fit in the compressed memory) to a current buffer size (e.g., a size of previously compressed data based on a current level of precision), which may be sufficiently close to an amount of reduction for acceptable precision. In certain cases, it may be suitable to modify the amount of reduction for acceptable precision to consider a magnitude of the stress and a current magnitude of the data in the buffer.

Unlike conventional rate control methods, embodiments of the present disclosure provide a rate control algorithm that may use a magnitude of the stress data and a magnitude of the buffer data to better refine a precision drop estimate. For example, some embodiments of the present disclosure enable prediction of the predicted precision p (e.g., following an initial compression operation of an initial slice) according to the following Equation 1

$$p=[(p_c-p_m)b_t/b_c]+p_m \quad \text{[Equation 1]}$$

where $p_c$ corresponds to current precision (e.g., a degree of precision previously used), $p_m$ corresponds to minimum effective precision, $b_t$ corresponds to target buffer size (e.g., a size of available memory for storing compressed stress data), and $b_c$ corresponds to current buffer size (e.g., a size of first updated compressed stress data for a slice). In some embodiments, the predicted precision p may be calculated according to Equation 1 by a processor of the display device (e.g., by the processing circuit 115 of the display 100 of FIG. 1, or by the system 200 of FIG. 2). For example, the predicted precision p may be calculated by the encoding circuit 230, although the predicted precision p may be calculated by the memory controller 225 in other embodiments.

In some situations, it may be suitable to modify the algorithm for predicting precision p to consider the magnitude of the stress and the current magnitude of the data in the buffer. After an initial compression operation, a stress MSB (most significant bit) and a memory MSB may be known. An MSB of the incoming stress data (e.g., a stress MSB) sets a minimum precision $p_s$ at which the stress data can affect the size of the updated compressed data. An MSB of the compressed data stored in the memory 305 (e.g., a memory MSB) may be known based on the size of the decompressed data, and may set the minimum buffer precision $P_b$ at which the memory can affect the size of the updated compressed data. By using the stress MSB, the minimum precision $p_s$ can be determined (e.g., for a 32-bit signal, $p_s$=32−the stress MSB), and using the memory MSB, the minimum buffer precision Pb can be determined (e.g., for a 32-bit signal, $p_b$=32−the memory MSB).

Accordingly, the minimum effective precision $p_m$ may be determined to be a minimum between the minimum precision $p_s$ and the minimum buffer precision $p_b$ based on Equation 1. Further, the effect of adding stress data to the image data may be different depending on the stress MSB, the memory MSB, and the current precision $p_c$. The predicted precision p is also strongly dependent on the ratio between the target buffer size $b_t$ and the current buffer size $b_c$.

Meanwhile, if the ratio between the target buffer size $b_t$ and the current buffer size $b_c$ is near 1, then a minimum precision drop of 1 may be correct, as may be the case with conventional rate control methods. However, if the ratio is much less than 1 (e.g., if the current buffer size $b_c$ is much higher than the target buffer size $b_t$), then it may be assumed that there was a large "injection" or introduction of entropy in the form of noise and/or high stress values in the stress data. As a result, using Equation 1 to predict the precision p may potentially result in the precision drop being overestimated (e.g., may quantize the data to a degree larger than needed to fit the compressed memory data in the memory, resulting in an unnecessary decrease in precision p). However, a level by which the adjusted precision p is reduced from the previously estimated precision will not be underestimated such that a large number of compression iterations are required. Further, as a result of Equation 1, the minimum precision $p_s$ and the minimum buffer precision $p_b$ may be used to increase the slope of Precision versus Buffer Size (e.g., to decrease the estimated decrease in precision shown in FIG. 4) when it is determined that further decreasing precision does not provide any benefit.

By using Equation 1, the system according to some embodiments of the present disclosure is able to utilize a unique compression algorithm to set a lower bound on the precision p if the MSB of the stress data is known. The compression algorithm of the disclosed embodiments is unique among compression algorithms in that the MSB in the memory is continually increasing (e.g., accumulated stress is generally not negative). Further, unlike other rate control algorithms, embodiments of the present disclosure consider the initial compression $p_c$, the magnitude of the added stress $p_s$, and the magnitude in the buffer $p_b$. Accordingly, the system is able to operate under various different types of stress data, is able to efficiently and quickly find the precision p to reduce average iterations, and is of low complexity.

It should be noted that other embodiments may provide a simplified version having less accuracy yet very good convergence by setting the minimum effective precision $p_m$=0. Further, it should be noted that some embodiments of the present disclosure may use log-search or a Newton-Raphson interpolation, although log-search for the precision would have a maximum of six iterations, and a Newton-Raphson interpolation would use greater complexity and more divisions than the algorithm corresponding to Equation 1.

Figure 5:
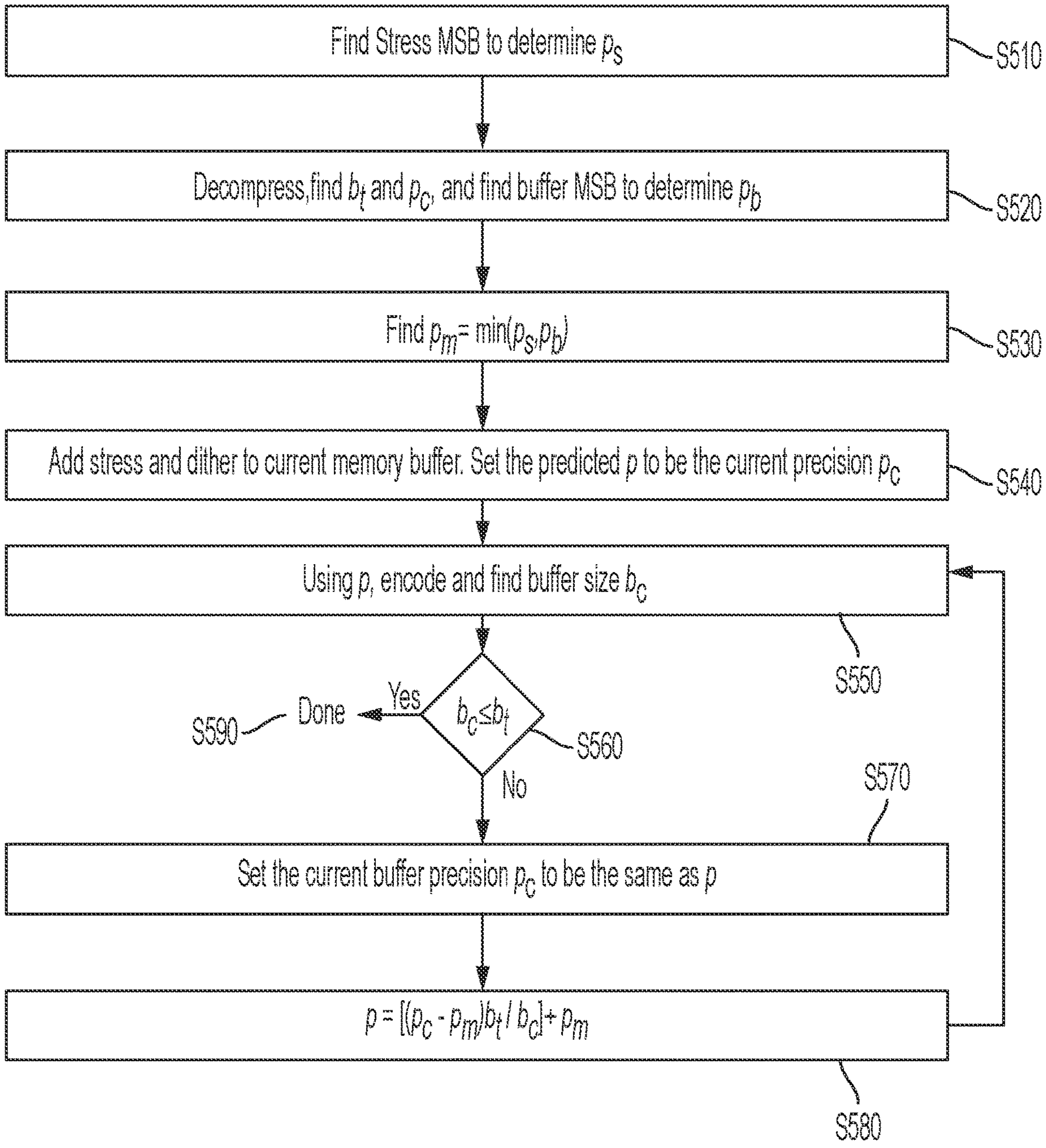
FIG. 5 depicts a flowchart for performing a method of determining precision according to some embodiments of the present disclosure.

FIG. 5 depicts a flowchart for performing a method of determining precision according to some embodiments of the present disclosure.

Referring to FIG. 5, the operations may be performed by the processing circuit 115 of the display 100 of FIG. 1, or by the system 200 of FIG. 2

At S510, a most significant bit of the stress data (e.g., a stress MSB) may be determined (e.g., from an initial compression operation on a previous slice), and may be used to determine a minimum precision $p_s$.

At S520, the stress data may be decompressed (e.g., by the decoding circuit 235 of FIG. 2) such that a target buffer size $b_t$ and the current precision $p_c$ may be determined, which may then be used to determine an MSB in the memory (e.g., a memory MSB).

At S530, a minimum effective precision $p_m$ may be determined to be a minimum between the minimum precision $p_s$ and the minimum buffer precision $p_b$. It should be noted that, in other embodiments, the minimum effective precision $p_m$ may be set to 0 to provide a simplified version with less accuracy yet good convergence.

At S540, stress and dither may be added to a current memory buffer (e.g., a current buffer size $b_c$), and the predicted precision p may be set to be the current precision $p_c$.

At S550, the predicted precision p may be used to compress the stress data and to find a current buffer size $b_c$.

At S560, it may be determined whether the current buffer size $b_c$ is less than or equal to a target buffer size $b_t$. If so, the precision p may be determined to be acceptable to allow for the compressed/compressed data to fit in the memory at S590.

If the current buffer size $b_c$ is greater than the target buffer size $b_t$, at S570, the current buffer precision $p_c$ may be set to be the same as the predicted precision p.

Then, at S580, the predicted precision p may be determined using Equation 1 ($p=[(p_c-p_m)b_t/b_c]+p_m$), and the process may return to S550 to again use the predicted precision p to compress and find the current buffer size $b_c$.

Accordingly, and as described above, instead of dividing the remaining buffer by the number of pixels (e.g., as may be done with a typical rate control method), embodiments of the present disclosure may use the ratio of the target buffer size to the current buffer size. The ratio of the target buffer size to the current buffer size may be close to the amount of reduction that is suitable for an acceptable degree of precision while allowing the compressed data to fit in the buffer.

Therefore, an advantage provided by embodiments of the present disclosure is the ability to converge the rate control to a suitable level of precision within there or fewer iterations (e.g., within two iterations) without a significant sacrifice of compression quality (e.g., without overshooting the target buffer size with a larger than necessary decrease in the precision).

That is, embodiments of the present disclosure improve rate control by providing a low-complexity rate control algorithm that efficiently uses the information available after a single compression, that converges quickly, that has low complexity (e.g., one division), which works well for worst case scenarios (e.g., due to noise), and which overestimates slightly for other possible cases. Further, embodiments of the present disclosure provide a simpler version that works well for high magnitude noise Although the above description is made with reference to embodiments of the present disclosure, those skilled in the art or those of ordinary skill in the relevant technical field will understand that various modifications and changes may be made to the present disclosure within the scope not departing from the idea and technical scope of the present disclosure described in the claims to be described below.

Therefore, the technical scope of the present disclosure should be determined by the claims without being limited to the content described in the detailed description of the specification, with functional equivalents of the claims to be included therein.

What is claimed is:

1. A method of rate control of a display device, the method comprising:

receiving compressed stress data for a slice of a display;

decompressing the compressed stress data to obtain reconstructed stress data for the slice of the display;

adding additional stress data to the reconstructed stress data to obtain updated stress data for the slice;

encoding the updated stress data at a first precision level ($p_c$) to generate first updated compressed stress data for the slice of the display;

in response to a size ($b_c$) of the first updated compressed stress data for the slice of the display exceeding a size ($b_t$) of a buffer, determining a second precision level (p) by performing a calculation using the first precision level ($p_c$), a third precision level ($p_s$) of the additional stress data, and a fourth precision level ($p_b$) of the buffer; and encoding the updated stress data at the second precision level (p) to generate second updated compressed stress data that is different than the first updated compressed stress data, wherein the third precision level ($p_s$) of the additional stress data corresponds to a level of precision at which the additional stress data increases a size of the updated stress data, and wherein the fourth precision level ($p_b$) of the buffer corresponds to a level of precision at which the buffer increases a size of the first updated compressed stress data.

2. The method of claim 1, wherein determining the second precision level (p) comprises setting the second precision level (p) to be equal to $[(p_c-p_m)b_t/b_c]+p_m$, wherein $p_m$ is a minimum of the third precision level ($p_s$) and the fourth precision level ($p_b$).

3. The method of claim 2, further comprising:

determining the third precision level ($p_s$) of the additional stress data based on a most significant bit of the additional stress data; and determining the fourth precision level ($p_b$) of the buffer based on a most significant bit of data in the buffer.

4. The method of claim 1, wherein determining the second precision level (p) comprises setting the second precision level (p) to be equal to $p_c\ b_t/b_c$.

5. The method of claim 1, wherein the first precision level ($p_c$) is a precision level used to generate the compressed stress data.

6. The method of claim 1, further comprising adding dither, in addition to the additional stress data, to the reconstructed stress data to obtain the updated stress data for the slice.

7. The method of claim 1, further comprising:

determining the second updated compressed stress data is able to fit in the buffer; and storing the second updated compressed stress data in the buffer.

8. A display device, comprising:

a buffer configured to store compressed stress data;

a decoding circuit configured to receive the compressed stress data for a slice of a display, and to decompress the compressed stress data to obtain reconstructed stress data for the slice of the display;

an adding circuit configured to add additional stress data to the reconstructed stress data to obtain updated stress data for the slice;

an encoding circuit configured to encode the updated stress data at a first precision level ($p_c$) to generate first updated compressed stress data for the slice of the display; and a processor configured to, in response to a size ($b_c$) of the first updated compressed stress data for the slice of the display exceeding a size ($b_t$) of the buffer, determine a second precision level (p) by performing a calculation using the first precision level ($p_c$), a third precision level ($p_s$) of the additional stress data, and a fourth precision level ($p_b$) of the buffer, wherein the encoding circuit is further configured to encode the updated stress data at the second precision level (p) to generate second updated compressed stress data that is different than the first updated compressed stress data, wherein the third precision level ($p_s$) of the additional stress data corresponds to a level of precision at which the additional stress data increases a size of the updated stress data, and wherein the fourth precision level ($p_b$) of the buffer corresponds to a level of precision at which the buffer increases a size of the first updated compressed stress data.

9. The display device of claim 8, wherein the processor is further configured to determine the second precision level (p) by setting the second precision level (p) to be equal to $[(p_c-p_m)b_t/b_c]+p_m$, wherein $p_m$ is a minimum of the third precision level ($p_s$) and the fourth precision level ($p_b$).

10. The display device of claim 9, wherein the processor is further configured to:

determine the third precision level ($p_s$) of the additional stress data based on a most significant bit of the additional stress data; and determine the fourth precision level ($p_b$) of the buffer based on a most significant bit of data in the buffer.

11. The display device of claim 8, wherein the processor is further configured to determine the second precision level (p) by setting the second precision level (p) to be equal to $p_c\ b_t/b_c$.

12. The display device of claim 8, wherein the first precision level ($p_c$) is a precision level used to generate the compressed stress data stored in the buffer.

13. The display device of claim 8, further comprising a dithering circuit configured to add dither, in addition to the additional stress data, to the reconstructed stress data to obtain the updated stress data for the slice.

14. The display device of claim 8, further comprising a memory controller configured to store the second updated compressed stress data in the buffer.

15. A non-transitory computer readable medium implemented with a display device, the non-transitory computer readable medium having computer code that, when executed on a processor, implements a method of rate control of the display device, the method comprising:

receiving compressed stress data for a slice of a display;

decompressing the compressed stress data to obtain reconstructed stress data for the slice of the display;

adding additional stress data to the reconstructed stress data to obtain updated stress data for the slice;

encoding the updated stress data at a first precision level ($p_c$) to generate first updated compressed stress data for the slice of the display;

in response to a size ($b_c$) of the first updated compressed stress data for the slice of the display exceeding a size ($b_t$) of a buffer, determining a second precision level (p) by performing a calculation using the first precision level ($p_c$), a third precision level ($p_s$) of the additional stress data, and a fourth precision level ($p_b$) of the buffer; and encoding the updated stress data at the second precision level (p) to generate second updated compressed stress data that is different than the first updated compressed stress data, wherein the third precision level ($p_s$) of the additional stress data corresponds to a level of precision at which the additional stress data increases a size of the updated stress data, and wherein the fourth precision level ($p_b$) of the buffer corresponds to a level of precision at which the buffer increases a size of the first updated compressed stress data.

16. The non-transitory computer readable medium of claim 15, wherein the computer code, when executed on the processor, determines the second precision level (p) by setting the second precision level (p) to be equal to $[(p_c-p_m)b_t/b_c]+p_m$, wherein $p_m$ is a minimum of the third precision level ($p_s$) and the fourth precision level ($p_b$).

17. The non-transitory computer readable medium of claim 16, wherein the computer code, when executed on the processor, further implements the method by:

determining the third precision level ($p_s$) of the additional stress data based on a most significant bit of the additional stress data; and determining the fourth precision level ($p_b$) of the buffer based on a most significant bit of data in the buffer.

18. The non-transitory computer readable medium of claim 15, wherein the first precision level ($p_c$) is a precision level used to generate the compressed stress data.

19. The non-transitory computer readable medium of claim 15, wherein the computer code, when executed on the processor, further implements the method by adding dither, in addition to the additional stress data, to the reconstructed stress data to obtain the updated stress data for the slice.

20. The non-transitory computer readable medium of claim 15, wherein the computer code, when executed on the processor, further implements the method by:

determining the second updated compressed stress data is able to fit in the buffer; and storing the second updated compressed stress data in the buffer.

* * * * *